Jan. 20, 1942.  H. C. OSBORN, JR  2,270,468
PRESSURE RELIEF VALVE
Filed Aug. 2, 1940

INVENTOR.
HENRY C. OSBORN JR.
BY Bates Teare & McBean
ATTORNEYS

Patented Jan. 20, 1942

2,270,468

UNITED STATES PATENT OFFICE 2,270,468

PRESSURE RELIEF VALVE

Henry C. Osborn, Jr., Cleveland Heights, Ohio, assignor to Glascote Products, Inc., Euclid, Ohio, a corporation of Ohio Application August 2, 1940, Serial No. 349,469

5 Claims. (Cl. 137—53)

This invention relates to an improved pressure relief valve and particularly to a relief valve which will act to relieve both excess and deficient pressures. This, therefore, is the general object of the present nvention. A more specific object of this invention is to provide a pressure relief valve which may be maintained in a highly sanitary condition to permit its use on containers such as are used for foodstuffs, as for instance, milk tanks, and the like.

Another object of this invention is to provide an improved pressure relief valve which will comprise a relatively small number of parts, easily separable, one from the other, and individually cleansed.

A further object of the present invention is to provide a pressure relief valve having an imperforate planar valve member to relieve pressures below or above predetermined limits, and which valve will be constructed as to facilitate replacement of the valve member without the removal of other valve parts and without changing the responsiveness of the valve to such predetermined minimum and maximum pressures.

A more specific object of the present invention is to provide a simple and efficient relief valve or vent device which may be economically manufactured and assembled and which will employ a valve member which may be readily manufactured, such as a planar inperforate disc or sheet of resilient material.

Other objects and advantages of the present invention will become more apparent from the following description, which relates to a preferred embodiment of the invention, illustrated in the accompanying drawing and the essential features of the invention will be set forth in the claims.

Figure 1:
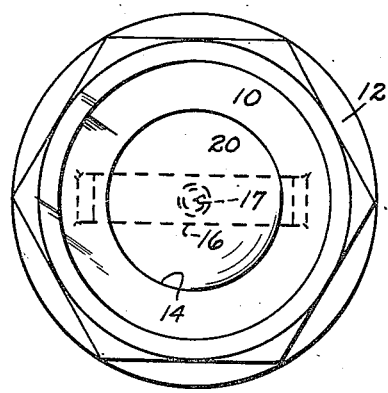
Figure 3:
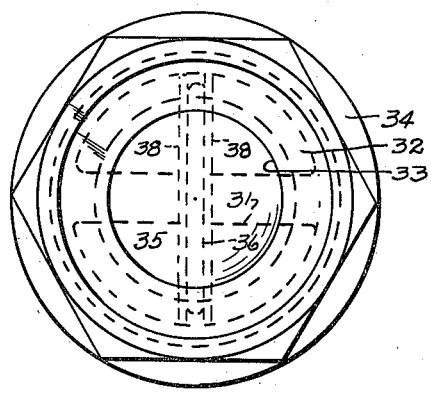
Figure 2:
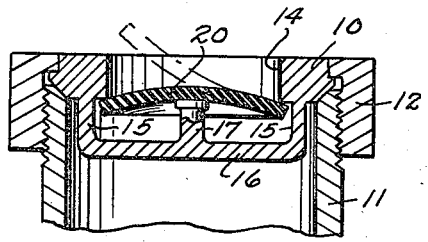
Figure 4:
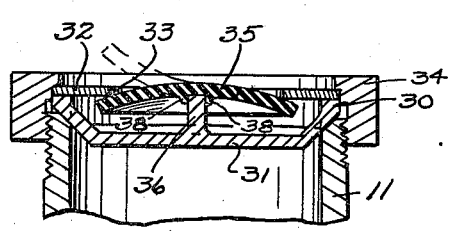
Figure 6:
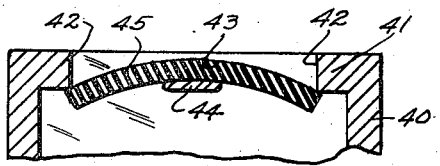
Figure 5:
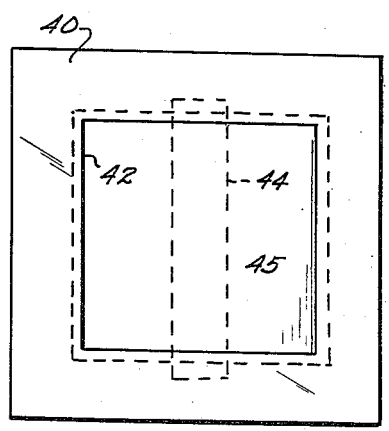
Figure 7:
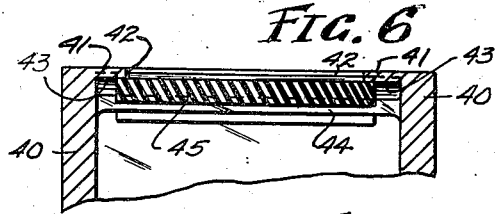

Referring now to the drawing, Fig. 1 is a plan view of a pressure relief valve constructed in accord with the present invention; Fig. 2 is a vertically extending axial section; Fig. 3 is a view similar to Fig. 1, but illustrating a different form of valve; Fig. 4 is an axial section of the device of Fig. 3; Fig. 5 is a plan view of a modified form of valve construction; and Figs. 6 and 7 are sectional views of the form of the inventon illustrated in Fig. 5.

The present invention is an improvement over that shown and claimed in my copending application, Serial No. 320,167, filed February 21, 1940. The present invention includes among its features, the provision of a pressure relief valve having a valve member comprising an imperforate planar disc or sheet of resilient material; the arrangement of the valve member so as to relieve excess and deficient pressures; and the provisions of an assembly wherein the valve member will be replaceable without the removal of other parts of the valve or without requiring the removal of the valve from the container or receptacle to which it is attached, thus permitting permanent attachment of the valve to the receptacle.

Referring now to the drawing, and especially to Figs. 1 and 2, it will be seen that my improved pressure relief valve comprises a ring 10 which may seat against the end of a vent tube or pipe 11 and be secured thereto by the union nut 12, as shown in Fig. 2, or, which, as will become hereinafter more apparent, may be permanently secured to such vent. The ring 10 is provided with an enlarged central opening or valve port 14, and a pair of downwardly extending arms 15 which project into the vent tube. These arms are connected at their tips by a bridge-like formation 16 which is spaced below the bottom plane of the ring and extends across the valve port opening 14. To facilitate the cleaning of the assembly, the arms and bridge are preferably formed as a unitary structure with the ring.

The valve member comprises an imperforate planar flexible resilient disc 20 preferably formed of a rubber composition or of a substance having generally similar physical characteristics. The valve disc 20 is slightly larger in diameter than the diameter of the valve port and is positioned beneath the ring 10 with its upper surface in contact with the bottom surface of the ring and closing the valve port opening therein. The valve disc is held seated against the ring 10 by a post 17 which projects upwardly and axially from the bridge 16 toward the valve port opening 14. The height of the post 17 is such that it presses the center of the valve disc into the opening, thus tensioning the valve disc and causing it to assume a dished or convex position, whereby the resiliency of the disc causes it to engage the bottom surface of the ring with a predetermined pressure.

When the pressure in the tank or receptacle to which the valve is attached falls below a predetermined amount, the periphery of the flexible valve disc 20 is forced downward by the atmospheric pressure external of the tank, thereby opening the valve port and retaining it open until the pressure in the tank is increased to the predetermined minimum. Adjustment of the minimum pressure may be accomplished by controlling the resiliency and thickness of the valve member and/or by the length of the valve stem 17 controlling the pressure of the valve member against the disc 10.

When the pressure in the tank increases above a predetermined maximum, it forces the valve member through the valve port 14 in the disc 10, somewhat as indicated in dotted lines in Fig. 2, whereupon the pressure within the tank is brought to atmospheric pressure. The frictional engagement between the periphery of the valve member 20 and wall 14 of the valve port opening retains the valve member 20 in an open position. The maximum pressure condition is predetermined by the thickness and resiliency of the valve disc combined with the relative diameters between the valve member 20 and the valve port opening. Relatively increasing the diameter of the valve member makes possible the maintenance of a higher pressure in the container with which the valve is used. Any suitable means may be employed to prevent loss of the valve member as for instance a wire cage.

As illustrated, my improved relief valve assembly is arranged to automatically reseat after relieving a deficient tank pressure, and to remain unseated after relieving an excess tank pressure. It is obvious that I may reverse these conditions by inverting the assembly relative to the vent opening.

In the form of the invention illustrated in Figs. 3 and 4, there is provided an annulus 30 which seats against the container vent tube 11 and which is provided with a bridge formation 31. Positioned above the annulus 30 is a disc 32 having a valve port opening 33. The annulus and disc are clamped in position on the vent tube by a clamping flange 34, which threadingly engages the tube.

The valve member shown in Figs. 3 and 4 comprises a flexible resilient disc 35 which is held tensioned against the under surface of the valve port disc 32 by a rib 36 carried by the bridge 31 and extending diametrically across the valve port opening. The upper surface of this rib is arcuate to dish and thereby tension the valve member. This rib extends transversely across the valve port opening and the ends of the rib project beneath the valve port disc 32. These ends are spaced below the valve port disc a slight distance less than the thickness of the valve member and, therefore, clamp the valve member in position. The valve member 35, as shown in Figs 3 and 4, is provided with a pair of spaced bead formations 38 between which the rib 36 seats, thereby centrally positioning the valve member.

In Figs. 5 to 7 inclusive, I have illustrated a relief valve structure employing a rectangular valve member as distinguished from the disc like members 20 and 35, illustrated in Figs. 1 to 4 inclusive. The form of valve comprises a hollow body 40 which, if desired, may be rectangular and secured to a container in any suitable manner. The upper portion of the body is provided with an inwardly extending peripheral flange 41, the inner walls 42 of which form a rectangular valve port opening. The under surface of this flange along two opposite sides is concave as indicated at 43 in Fig. 7. Extending centrally across the body, in a direction transverse relative to the sides 43 is a bridge 44, which is spaced below the concave flanges a distance slightly less than the thickness of a rectangular valve member 45.

The valve member 45, like the valve members 20 and 35, is formed of an imperforate sheet of composition rubber, or some other similar resilient material capable of being tensioned when curved and of sufficient flexibility to permit it to be forced through the valve port opening by fluid pressure from below. In this construction, the valve member may be manually pushed into position between the bridge 44 and flanges 42.

From the foregoing construction, it will be seen that my improved relief valve comprises but two members, one of which may be secured directly to a receptacle as by welding or by a suitable clamping nut, and the other member, namely the flexible valve member, comprises a simple resilient imperforate member which is readily assembled and easily replaced.

I claim:

1. In a pressure relief valve, a member having a valve port opening therein and an arm supported by said member and projecting inwardly below said valve port, a resilient flexible imperforate valve member engaging the bottom surface of the disc to close the opening therein, and a rigid member extending upward from said arm and engaging the bottom surface of said valve member to force said valve member into contact with the undersurface of said member and thereby close said valve opening, the relative diameters of said valve member and valve port being such that an excess pressure acting from below will force the valve member partially through the valve port to open the valve.

2. In a pressure relief valve, a disc having an enlarged central opening and an arm supported by said disc and projecting downwardly and inwardly therefrom to a point below said opening, a resilient flexible valve member having a diameter greater than the diameter of the opening, a rigid post carried by said disc and extending axially upward to exert an upward pressure on said valve member to dish and thereby retain the valve member seated against the under surface of the disc with a predetermined pressure, the perimeter of said valve member being free, whereby an excess pressure will force the valve member partially through said opening to open the valve.

3. In a pressure relief valve, a member having a valve port opening extending therethrough, and an arm projecting downwardly and inwardly to a point below said valve port opening, a rigid valve stem projecting upward from said arm axially toward the valve port opening, a flexible resilient imperforate valve member carried by said arm and having a substantially flat surface adapted and arranged to engage the bottom surface of said ported member and close the valve port opening, said rigid valve stem being of such a length as to normally retain said valve member in a convex position, and wherein the resiliency of said member causes it to form a pressure seal with the valve stem and the lower surface of the ported member, and wherein said valve member is constructed and arranged to relieve pressures slightly in excess of and slightly below atmospheric pressure.

4. In a pressure relief valve, a valve body having a valve opening, a valve supporting rib carried by the body and extending transversely across said opening, an imperforate resilient valve member having its upper surface in contact with the lower surface of said body, and its lower surface engaged by said rib, said member being of such thickness relative to the distance between the upper surface of said rib and the lower surface of said body as to be distorted whereby the resiliency of said member will cause it to resiliently close said valve opening, and wherein said member is of such size relative to said opening as to permit a portion of said member to be forced through said opening by fluid pressure acting on the bottom of said member.

5. In a pressure relief valve, a disc having a central opening, an arcuate bridge carried by said disc and extending diametrically across the opening in said disc and a normally planar resilient valve member of a diameter greater than the diameter of said opening interposed between said bridge and said disc and wherein said bridge co-acts with and tensions said valve member, whereby the resiliency of said valve member maintains contact between the periphery of said valve member and said disc, said valve member being arranged and adapted to relieve pressures above a predetermined maximum or below a predetermined minimum and to remain in a relieving position consequent upon the relief of one of said types of pressure.

HENRY C. OSBORN, Jr.